April 7, 1959 J. R. TINSMAN 2,880,430
FLUID OPERATED RECIPROCATING RACK MEANS FOR UNIDIRECTIONALLY
ROTATING A THREADING TOOL
Filed Aug. 6, 1954 2 Sheets-Sheet 1

Inventor
Jack R. Tinsman
By Carlson, Pitzner, Hubbard & Wolfe
Atty's

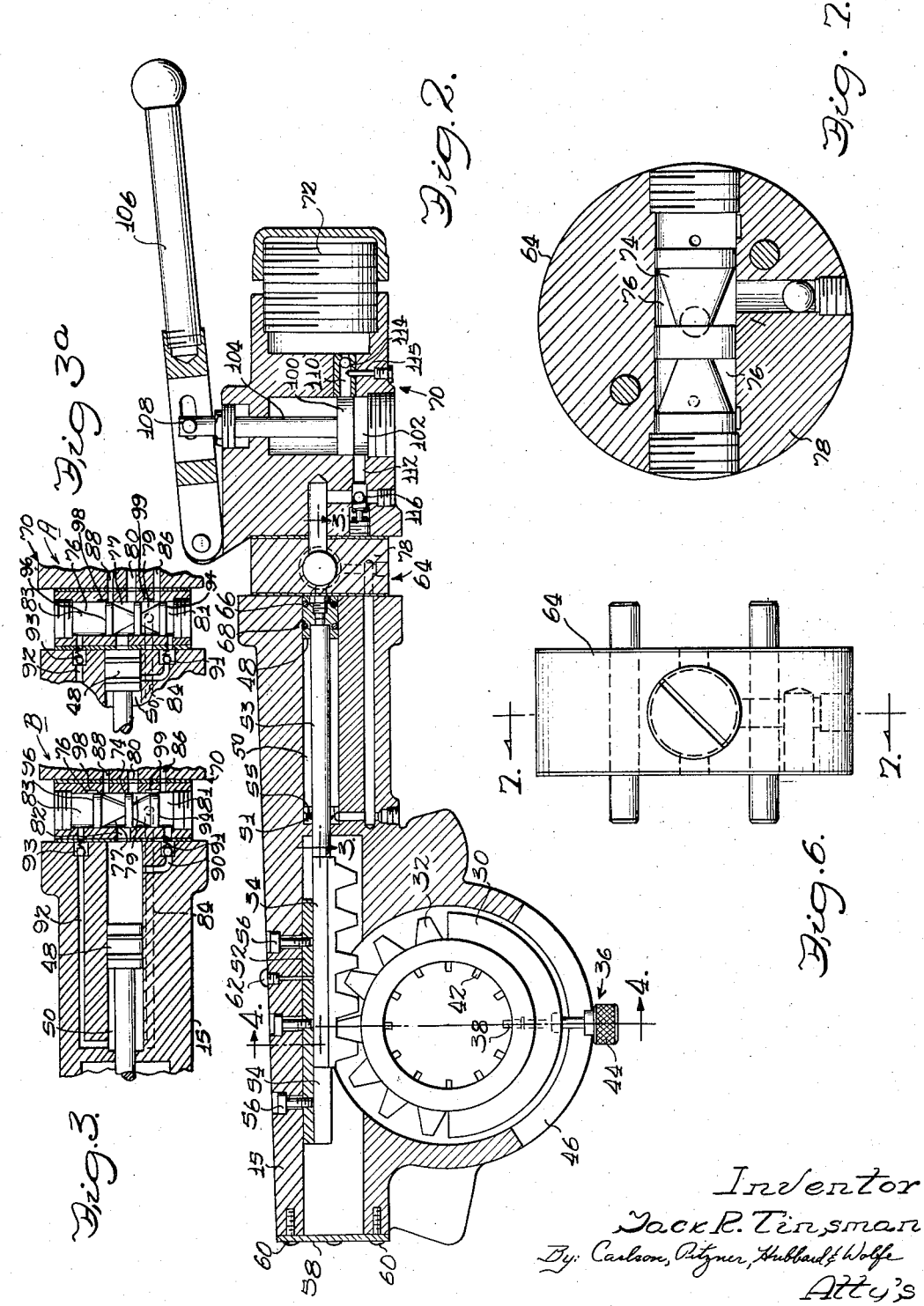

United States Patent Office 2,880,430
Patented Apr. 7, 1959

2,880,430

FLUID OPERATED RECIPROCATING RACK MEANS FOR UNIDIRECTIONALLY ROTATING A THREADING TOOL

Jack R. Tinsman, Park Ridge, Ill., assignor to William J. Speckman, Joliet, Ill., and Carl J. Wilhelmi, Chicago, Ill.

Application August 6, 1954, Serial No. 448,226

2 Claims. (Cl. 10—89)

The present invention relates generally to tools for forming screw-threads and more especially to such tools of the type finding particular though by no means exclusive utility in the forming of screw-threads on pipe, conduit, rod stock and the like.

On construction and installation projects such, for example, as the building and equipping of housing units and industrial plants, it is necessary to cut numerous threads on pipes, tie-rods, conduits, and the like, to be incorporated in heating, plumbing, electrical, structural and other systems. Conventionally these pipes, etc. are cut to fit the requirements of the particular job. Thus it is particularly desirable to accomplish threading on the job.

The most familiar tool for this purpose is the conventional manually-operated threader embodying die sets and a stock for mounting the dies and rotating the same on the stationarily mounted pipe. Day-long use of such devices is obviously fatiguing for the operator even on small stock. Further, the threading of large stock usually requires two or more operators to turn the stock-and-die set on the workpiece being threaded. There are commercially available power-actuated thread-cutting devices, but these have proved to be inconvenient in that they must always have a connection with a power source for the supply of motive power thereto. Since on new construction jobs power is not ordinarily readily available, either a temporary power source must be provided or the work must be transported from the job to a place where there is power to operate the threading machine.

Accordingly it is a general object of the present invention to overcome the foregoing disadvantages through the provision of a fully self-contained automatic threading tool which can be readily manipulated by a single operator, which requires no outside source of power, and which permits of economical manufacture.

It is another object of the present invention to provide a rotatable chuck which may be used in a tool of the aforementioned general character either to grip and rotate a workpiece or a cutting die, one with respect to the other.

It is a further object of the invention to provide an improved directional control valve which is automatically operable so as to permit unidirectional rotation of the chuck of the tool alternatively in forward or reverse direction.

Other objects and advantages will become apparent from the attached detailed description and upon reference to the drawings, in which:

Fig. 2 is a longitudinal section taken along the line 2—2 in Fig. 1.

Fig. 3 is a schematic fragmentary section taken along the line 3—3 in Fig. 2 showing the valving element in position B.

Fig. 3a is a schematic fragment of Fig. 3 in which the valving element is shown in position A.

Fig. 6 is an enlarged view of the valve shown in Figs. 1 and 2.

Fig. 7 is a vertical section taken along the line 7—7 in Fig. 6.

Figure 1:
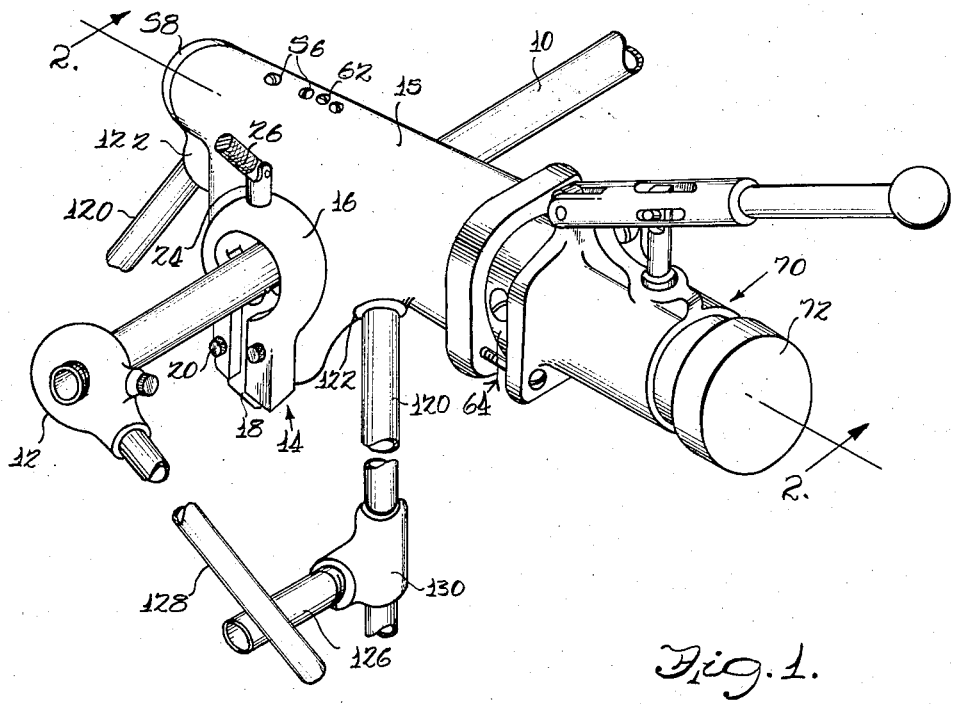
Figure 1 is a perspective view of a tool embodying the features of the present invention as used with a stationary cutting die.
Figure 5:
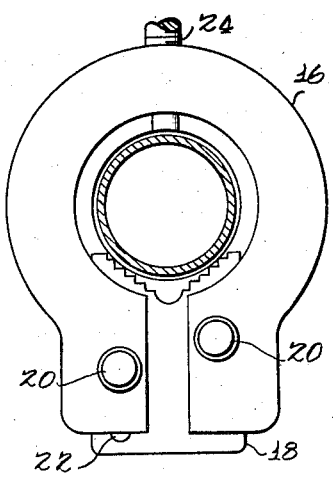
Fig. 5 is a front elevation of the chuck.
Figure 4:
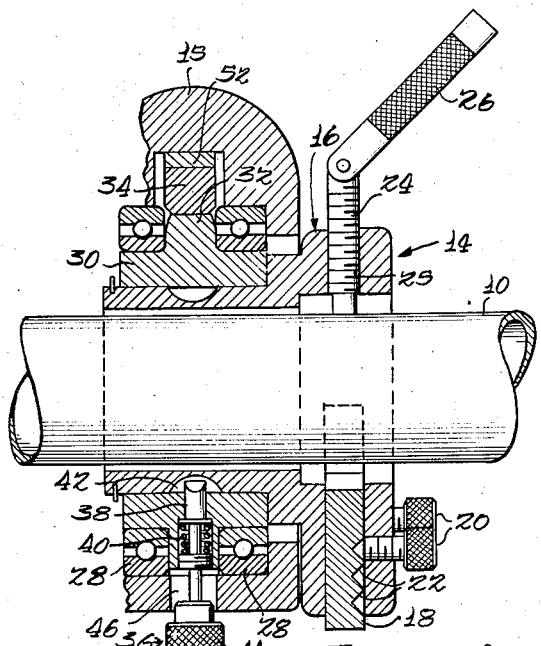
Fig. 4 is a fragmentary section taken along the line 4—4 in Fig. 2.

While the invention has been described in connection with a preferred embodiment, it will be understood that it is not intended to limit the invention thereto, but it is intended to cover all modifications and alternative constructions falling within the spirit and scope of the invention as expressed in the appended claims.

In carrying out the present invention, the illustrative device is adapted to grip a workpiece such as a pipe 10 and to rotate the same with respect to an independently supported stationary cutting or threading die 12 in order to form screw-threads thereon. More particularly, as shown in the drawings, the instant embodiment includes a chuck assembly 14 which is rotatably mounted on a housing 15. Within the housing is means for rotating the chuck assembly 14 and the workpiece 10 gripped therein. Additionally, the housing is equipped with means for holding cutting members such as conventional pipe dies stationary with respect to the chuck assembly 14.

The chuck assembly 14 comprises a chuck body 16 which grips the workpiece 10 by means of a chuck jaw 18 mounted within the chuck body and adjustable in position to accommodate various size workpieces such, for example, as pipes of different nominal sizes or diameters. For this purpose two adjusting screws 20 are provided which are adapted to engage notches 22 in the chuck jaw. The notches 22 are arranged in spaced parallel rows and in staggered and spaced relation to one another so as to provide a chuck jaw setting for each standard nominal pipe size between ½" and 2", inclusive.

For the purpose of firmly securing the workpiece 10 within the chuck jaw 18, a clamping stud 24 is provided opposite the chuck jaw. The stud 24 is received in screw-threaded engagement in a hole 25 in the chuck body 16 and is formed so that one end of the stud can project completely through the hole 25 for engagement with the workpiece 10 so as to clamp it securely against the chuck jaw 18. To facilitate operation thereof, the stud 24 is equipped with a fingerpiece 26.

A sleeve-like portion of the chuck body 16 extends within the housing 15 wherein it is journaled in bearings 28 and is retained therein by means of a pinion gear 30, within the central portion of which the chuck body is telescoped.

The teeth 32 on the gear 30 extend from the central portion of the outer periphery of this gear so as to mesh with a rack gear 34 contained within the housing 15. For the purpose of translating the reciprocal movement of the rack gear 34 into unidirectional rotation of the pinion gear 30, a ratchet assembly 36 is provided within that portion of the housing 15 adjacent to the pinion gear 30. A ratchet pawl 38 biased by a spring 40 engages notches 42 spaced about the outer periphery of the sleeve portion of the chuck body 16. The pawl 38 is provided with a flat sided pawl knob 44 which normally rides in a guide slot 46 formed in the lower half of the chuck body 16. Reverse rotation of the chuck body 16 can be affected by reversal of the position of the ratchet pawl 38. This is accomplished by withdrawing the pawl knob 44 from the slot 46, against the action of its biasing spring 40 and rotating the ratchet pawl 38 through 180° with respect to the guide slot 46. It will be noted that the walls of the guide slot 46 prevent the biasing spring 40 from pulling the pawl knob 44 back into the guide slot 46 until the flat sides of the knob register with the slot.

For the purpose of moving the rack gear 34 in a reciprocating manner so as to effect rotation of the gear 30 and the chuck 16, a piston 48 is provided which as shown is connected axially to the rack gear 34 by means of a piston rod 53. The piston 48 is received within a cylinder 50 defined by the housing 15.

The housing 15 is generally hollow longitudinally for reception of the piston and rack gear assembly, 48, 34. A rack gear bearing 52 is provided within the rack gear cavity 54 and in face-to-face contact with the upper surface of the rack gear 34. For the purpose of retaining the rack gear bearing 52 within the cavity 54, rack bearing screws 56 are provided. A fluid diverter 51 is provided at the forward end of the cylinder 50 to distribute pressure fluid evenly within the annular space defined by the cylinder 50 and the piston rod 53. The fluid diverter 51 also includes a piston rod static seal ring 55 to prevent leakage of pressure fluid from the cylinder 50 into the rack gear cavity 54. The housing 15 is closed at one end by an end plate 58 held to the housing with end plate screws 60. A grease fitting 62 permits lubrication of the rack gear 34 and rack gear bearing 52 interface. The other end of the housing 15 is closed by a valve assembly 64 which is interposed between the cylinder 50 end of the housing 15 and a source of fluid pressure.

In the present form of the invention, wherein the device is fully self-contained, a source of fluid pressure is provided in the form of a manually operated hydraulic pump 70 including a fluid reservoir 72. A fluid tight piston seal within the cylinder is effected through the insertion of O-rings 66 in suitable piston recesses 68. The valve assembly 64 controls the flow of pressure fluid between the pump 70 and the piston and cylinder assembly 48, 50. In this connection it is to be noted that the illustrative device is designed to occupy a minimum of space since often the construction areas in which it is used are restrictively small. Accordingly this device utilizes a plurality of short piston strokes within a relatively short piston and cylinder section. In carrying out the present invention then, a unique automatic reciprocating piston drive is incorporated. This feature includes the use of a valve assembly 64 embodying a valving element having forward and return positions which is automatically shifted between such positions upon attainment by the piston 48 of the limits of its strokes. As shown the valve assembly 64 includes a generally cylindrical spool 74 which is shifted automatically within a bore 76 formed in a block 78 interposed between the pressure fluid source and the main housing 15. The valve assembly 64 includes the bore 76 and valve spool 74 residing therein, a first 77 and a second 79 fluid chamber intermediate the ends of the valve spool 74 and defined by the spool and the bore 76, a first 81 and a second 83 end chamber similarly defined, an inlet passage 80 from the hydraulic pump 70, a passage 82 providing communication between the first intermediate chamber 77 and one end of the cylinder 50, and a similar passage 84 connecting the second intermediate chamber 79 and the other end of the cylinder 50. Drain ports 86 and 88 are provided between the intermediate chambers 79 and 77 respectively and the fluid reservoir 72, and a fluid pressure relief duct 90 communicates between a position near one end of the cylinder 50 and the intermediate chamber 81, such duct being obstructed from flow of pressure fluid into the chamber 81 by means of a spring-biased ball check valve 91 placed within the duct 90 at the housing 15 and valve block 78 interface. A similar pressure fluid relief duct 92 obstructed by a similarly positioned spring-biased ball check valve 93 communicates between a position near the other end of the cylinder 50 and the intermediate chamber 83. As shown in the drawings, the passages 80, 82, and 84, the ports 86 and 88, and the ducts 90 and 92 all communicate with the valve bore 76 at spaced points along the valve bore 76 so that the valve spool 74 can be made to shift therein upon the inlet to the valve bore 76 and outlet from this bore of pressure fluid through the significant passages, ports, and ducts.

More specifically, a typical reciprocating action of the piston 48 may be traced upon reference to Fig. 3a. Pressure fluid from the pump 70 enters the valve bore 76 through the inlet passage 80 and finds the valve spool in position A. With the valve in this position the pressure fluid is directed into the first intermediate chamber 77 and through the passage 82 and thus from the valve bore 76 to the near end of the cylinder 50. The pressure exerted by the fluid forces the piston 48 from the near end of the cylinder 50 toward the far end thereof. As the piston moves forward, fluid from the cylinder 50 ahead of the piston 48 is expelled through the passage 84 into the second intermediate chamber 79 and from there to the drain port 86 and thence to the fluid reservoir 72. Upon the attainment of the end of the piston stroke, the piston seals off the pressure relief duct 92 which is connected with the cylinder 50 adjacent to the forward end thereof. Thus as the operator continues the action of the pump 70, fluid pressure increases until such pressure is sufficient to overcome the predetermined spring tension holding the ball check valve 91 in closed condition in the pressure relief duct 90. The ball check valve 91 then is forced open and releases pressure fluid into the first end chamber 81 so that such fluid acts upon the full face of the end 94 of the valve spool 74 to shift the spool into position B. For the purpose of preventing entrapment of fluid in the second end chamber 83, a channel 98 formed within and extending around a part of the periphery of the valve bore 76 is provided which bypasses fluid from the entrapped space around the end 96 of the valve spool and into the first intermediate chamber 77 and from there to the drain port 88 and thence to the fluid reservoir 72. Similarly, a channel 99 is provided at the opposite end of the valve bore 76 to prevent entrapment of fluid in the end chamber 81 upon re-shuttling of the valve spool 74.

In position B, the valve spool 74 is set to direct the return of the piston 48 through the cylinder 50 by supplying pressure fluid from the pump 70 into the valve bore 76 through the inlet passage 80. With the valve in this position, the pressure fluid is directed into the second intermediate chamber 79 and through the passage 84 to the forward end of the cylinder 50. The pressure exerted by fluid flowing through the passage 84 forces the piston 48 to return to the near end of the cylinder 50. Upon such return movement of the piston, fluid from behind the piston is expelled through the passage 82 into the first intermediate chamber 77 and thence to the drain port 88 for return to the fluid reservoir 72. Upon the attainment of the end of its return stroke, the piston 48 seals off the pressure relief duct 90 connected with the cylinder 50 adjacent to the near end thereof. Continued operation of the pump 70 causes an increase in fluid pressure, as before, until the pretensioned spring-biased ball check valve 93 within the pressure relief duct 92 is forced open. Pressure fluid is then released into the second end chamber 83 so that such fluid acts upon the full face of the end 96 of the valve spool 74 to shift the valve spool back into position A. It will be apparent, therefore, that reciprocating action of the piston 48 is thus effected, which together with the action of the ratchet pawl 38 produces automatically unidirectional rotation of the chuck 16 and a workpiece 10 mounted therein.

The pump 70 which includes a plunger 100 disposed in a pump chamber 102 and held therein by a plunger rod 104 the end of which rod is attached to a manually operated external arm 106 by a pin-in-slot type pivotal connection 108, produces the desired fluid pressure. A channel 110 is provided for inlet of fluid from the fluid reservoir 72 to the pump chamber 102 and a similar channel 112 is provided for outlet of fluid to the valve assembly 64. A ball check valve 114 and retainer 115 are provided within the inlet channel 110 and a spring-biased ball check valve is provided 116 within the outlet channel 112 to prevent fluid flow in a direction opposite to that desired.

The illustrative device is adapted to be supported on legs 120, preferably three in number, which may conveniently be formed of ordinary pipe stock. To receive the legs the housing is provided with three spaced bosses 122. The bosses 122 are internally threaded to accommodate the complementally threaded ends of the legs 120.

As hereinbefore set forth, the illustrative embodiment of the present invention is adapted to grip and to rotate a workpiece 10. This enables its utilization with any conventional stock and die set 12 or cutter, for example, and to the end that the illustrative device permits of operation by a single workman, means is provided for holding the stock and die tool 12 stationary so that the workpiece 10 is rotated with respect thereto. In the present instance this means comprises a stop 126 carried by one of the legs and adapted for engagement by the handle 128 of the stock and die tool. As shown the stop 126 comprises simply a forwardly projecting length of pipe received in a pipe T 130 incorporated in one of the legs 120. After the application of the stock and die tool 12 to the workpiece 10 held in the chuck assembly 14, the handle 128 of the stock and die tool engages the stop 126 and thus is held secure from companionate rotation as the workpiece is rotated upon operation of the illustrative tool.

It will be appreciated, of course, that though the invention has been illustrated and described in a tool which is adapted to rotate a workpiece 10 with respect to a conventional cutting tool 12, the invention contemplates operation on a stationarily supported workpiece 10 by a cutting element mounted for rotation with respect thereto in a similar tool. This can be accomplished, for example, simply by the use of a suitable cutting element holder mounted in the chuck body 16.

From the foregoing it will be seen that a tool embodying the features of the present invention is a fully self-contained unit by means of which a cutting operation such as the formation of screw-threads can be performed on a wide range of sizes of workpieces. The present construction and arrangement permits of operation even on large sizes of workpieces by a single operator who has but to mount the workpiece 10 and cutting device 12 with respect to the instant tool and effect operation simply by manipulation of the pump 70. By means of the construction and arrangement of the control valve assembly 64, piston reciprocation is effected to rotate the chuck 16 contained pinion gear 30, and the ratchet pawl 38 assembly between the gear 30 and the chuck body 16, automatically effecting unidirectional rotation of the chuck.

I claim as my invention:

1. A self-contained threading tool comprising, in combination, an elongated unitary housing; a chuck rotatably mounted on said housing in transverse relation to the axis thereof; and means for rotating said chuck including a hydraulic piston and cylinder assembly axially aligned within the housing, a rack gear disposed in the housing and axially aligned with and secured to the piston, a pinion gear engaged by the rack gear and secured to said chuck for rotation therewith, a manually operable short-stroke pump compactly secured to the housing for supplying pressure fluid to the piston and cylinder assembly, a fluid reservoir adjacent said pump for supplying same and for receiving fluid exhausted from said piston and cylinder assembly, valve means interposed between said pump and said assembly for alternatively supplying pressure fluid from said pump to said cylinder and controlling the exhaust of fluid from the opposite sides of said piston to said fluid reservoir to effect reciprocation of the piston within the cylinder, and means associated with said valve means responsive to attainment of the limits of the piston stroke for automatically reciprocating the piston and rack gear to thereby rotate said chuck, said chuck rotating means further including a reversible pawl and ratchet connection between said chuck and said pinion gear for effecting unidirectional chuck rotation as an incident to manual operation of said short-stroke pump.

2. A self-contained threading tool comprising, in combination, an elongated unitary housing; a chuck rotatably mounted on said housing in transverse relation to the axis thereof; and means for rotating said chuck including a hydraulic piston and cylinder assembly axially aligned within the housing, a rack gear disposed in the housing and axially aligned with and secured to the piston, a pinion gear engaged by the rack gear and secured to said chuck for rotation therewith, a manually operable short-stroke pump compactly secured to the housing for supplying pressure fluid to the piston and cylinder assembly, a fluid reservoir adjacent said pump for supplying same and for receiving fluid exhausted from said piston and cylinder assembly, valve means interposed between said pump and said assembly for alternatively supplying pressure fluid from said pump to said cylinder and controlling the exhaust of fluid from the opposite sides of said piston to said fluid reservoir to effect reciprocation of the piston within the cylinder, means associated with said valve means responsive to attainment of the limits of the piston stroke for automatically reciprocating the piston and rack gear to thereby rotate said chuck, and means for translating the reciprocating motion of said rack gear into unidirectional rotative motion of said chuck.

References Cited in the file of this patent

UNITED STATES PATENTS

| Number | Name | Date |
| --- | --- | --- |
| 719,703 | Thibert | Feb. 3, 1903 |
| 1,196,041 | Smith | Aug. 29, 1916 |
| 1,789,412 | Oster | Jan. 20, 1931 |
| 1,871,732 | Olmstead | Aug. 16, 1932 |
| 1,952,690 | Strom | Mar. 27, 1934 |
| 1,987,505 | Edler | Jan. 8, 1935 |
| 2,302,232 | MacNeil | Nov. 17, 1942 |
| 2,374,176 | Cook | Apr. 24, 1945 |
| 2,387,549 | Wineman | Oct. 23, 1945 |
| 2,550,723 | Ross | May 1, 1951 |
| 2,617,257 | Douglas | Nov. 11, 1952 |
| 2,745,386 | Wildeman | May 15, 1956 |